United States Patent
Ogura et al.

(10) Patent No.: US 12,022,208 B2
(45) Date of Patent: Jun. 25, 2024

(54) IMAGING APPARATUS WITH MULTIPLE FRAME RECORDING AND CONTROL SHOOTING PERIOD

(71) Applicant: Panasonic Intellectual Property Management Co., Ltd., Osaka (JP)

(72) Inventors: Motonori Ogura, Kyoto (JP); Tomohiro Oogami, Nara (JP); Kohei Fukugawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 140 days.

(21) Appl. No.: 17/831,090

(22) Filed: Jun. 2, 2022

(65) Prior Publication Data

US 2022/0394176 A1 Dec. 8, 2022

(30) Foreign Application Priority Data

Jun. 8, 2021 (JP) ................. 2021-096088

(51) Int. Cl.
*H04N 23/951* (2023.01)
*H04N 23/667* (2023.01)
*H04N 23/67* (2023.01)

(52) U.S. Cl.
CPC ......... *H04N 23/951* (2023.01); *H04N 23/667* (2023.01); *H04N 23/67* (2023.01)

(58) Field of Classification Search
CPC .... H04N 23/951; H04N 23/667; H04N 23/67; H04N 23/673; H04N 23/6812; H04N 23/687; H04N 23/69; H04N 23/60
See application file for complete search history.

(56) References Cited

U.S. PATENT DOCUMENTS

2009/0245778 A1 10/2009 Shibuno et al.
2011/0043678 A1 2/2011 Ueda et al.
(Continued)

FOREIGN PATENT DOCUMENTS

JP 2008-276131 A 11/2008
JP 2009-258718 A 11/2009
(Continued)

OTHER PUBLICATIONS

Notice of Reasons for Refusal for corresponding JP Patent Appln. No. 2021-096088 issued Sep. 7, 2021 with a machine translation.

*Primary Examiner* — Gevell V Selby
(74) *Attorney, Agent, or Firm* — Renner, Otto, Boisselle & Sklar, LLP

(57) ABSTRACT

An imaging apparatus includes: an image sensor that captures a subject image formed to generate image data; a recorder that records first image data showing images sequentially captured by the image sensor at a shooting period; and a controller operates the image sensor with a frame period shorter than half period of the shooting period, to generate one or plural frames of second image data by capturing in another frame period than the frame period for capturing the first image data within the shooting period. The second image data shows an image used for control in the imaging apparatus, captured with a setting different from a setting for the first image data. The control is performed based on a plurality of frames of image data including the one or plural frames of second image data, the plurality of frames being obtained by multiple times of capturing in the shooting period.

12 Claims, 7 Drawing Sheets

(56) References Cited

U.S. PATENT DOCUMENTS

| | | | |
|---|---|---|---|
| 2011/0091194 A1 | 4/2011 | Isaka et al. | |
| 2015/0312471 A1* | 10/2015 | Kosaka | H04N 23/71 |
| | | | 348/345 |
| 2019/0182414 A1* | 6/2019 | Okubo | H04N 23/80 |
| 2021/0314483 A1* | 10/2021 | Sakurabu | H04N 23/55 |
| 2021/0377479 A1* | 12/2021 | Sakurabu | H04N 25/704 |

FOREIGN PATENT DOCUMENTS

| | | |
|---|---|---|
| JP | 2010-113291 A | 5/2010 |
| JP | 4594450 B2 | 12/2010 |
| JP | 2020-098943 A | 6/2020 |
| WO | 2009-130892 A1 | 10/2009 |

* cited by examiner

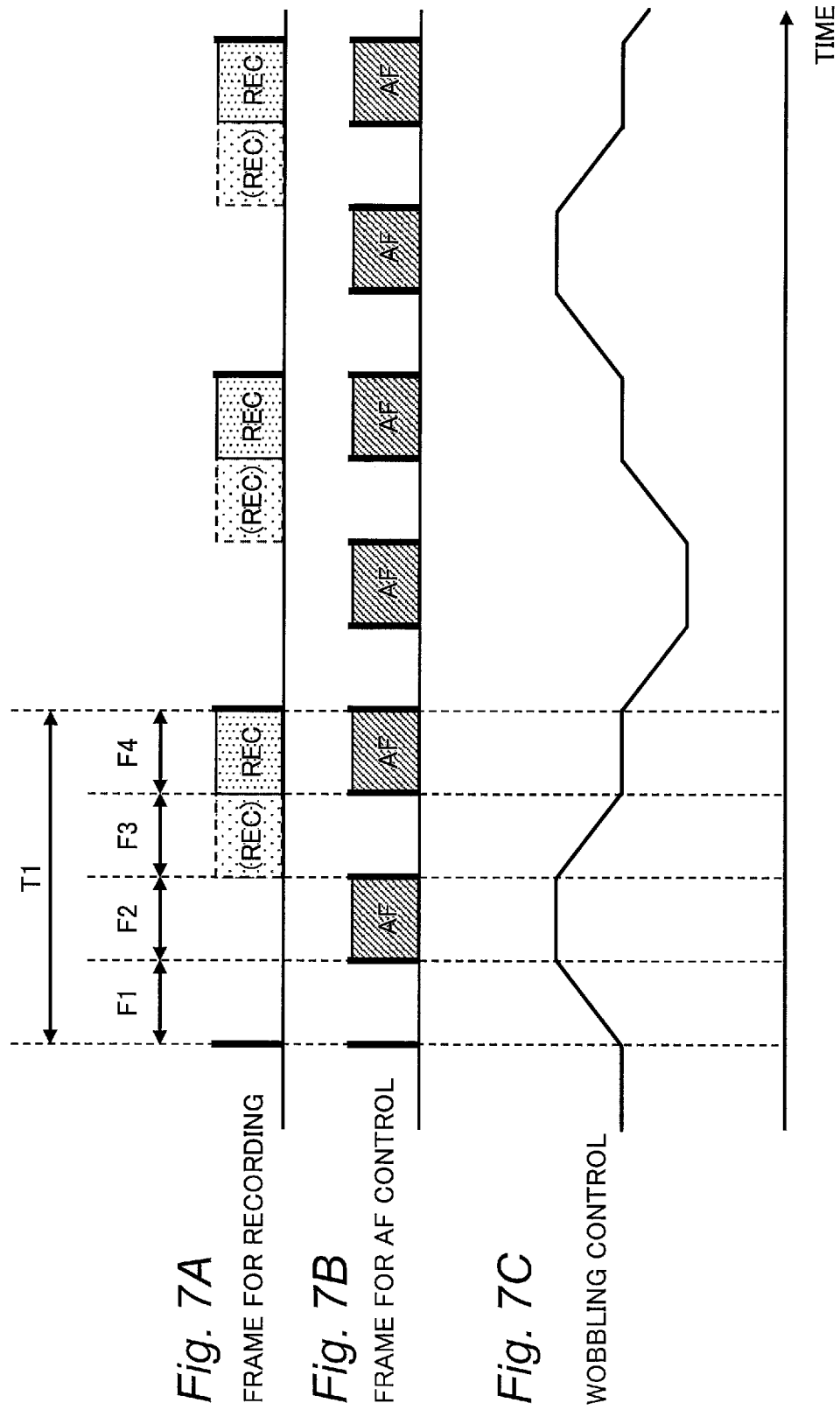

IMAGING APPARATUS WITH MULTIPLE FRAME RECORDING AND CONTROL SHOOTING PERIOD

BACKGROUND

1. Technical Field

The present disclosure relates to an imaging apparatus that performs shooting such as moving image shooting.

2. Related Art

JP 2008-276131 A discloses a camera system capable of improving the accuracy of a contrast-type autofocus operation when shooting a moving image. In this camera system, during a wobbling operation on the focus lens around a current position in an optical axis direction, an image exposed when the focus lens is at the current position is recorded in a memory when shooting a moving image. This solves the problem in that an image that is in focus or out of focus due to the wobbling operation is recorded.

SUMMARY

The present disclosure provides an imaging apparatus capable of facilitating accurate control performed during image shooting.

In an aspect according to the present disclosure, an imaging apparatus includes an image sensor that captures a subject image formed via an optical system to generate image data, a recorder that records first image data showing images sequentially captured by the image sensor at a predetermined shooting period, and a controller that controls an operation of the image sensor and the recorder. The controller operates the image sensor with a frame period shorter than half period of the shooting period, to generate one or plural frame of second image data by capturing in another frame period other than the frame period for capturing the first image data within the shooting period. The second image data shows an image used for control in the imaging apparatus, and is captured with a setting different from a setting for first image data. The control is performed based on a plurality of frames of image data including the one or plural frames of second image data, the plurality of frames being obtained by multiple times of capturing in the shooting period.

In another aspect according to the present disclosure, an imaging apparatus includes an image sensor that captures a subject image formed via an optical system to generate image data, a recorder that records first image data showing images sequentially captured by the image sensor at a predetermined shooting period, and a controller that controls an operation of the image sensor and the recorder. The controller operates the image sensor with a frame period shorter than half period of the shooting period, to generate one or plural frames of second image data in addition to capturing the first image data within the shooting period. The second image data shows an image used for control in the imaging apparatus, and is captured with a setting different from a setting for the first image data. The optical system includes a focus lens that is movable along an optical axis. The frame period is ⅓ period or less of the shooting period. The controller causes the focus lens to move to a position of the focus lens back and forth along the optical axis for each frame period at which the second image data is captured in the shooting period. The controller performs, as the control using the second image data, a focus control to set a position of the focus lens at capturing the first image data.

In further another aspect according to the present disclosure, an imaging apparatus includes an image sensor that captures a subject image formed via an optical system to generate image data, a recorder that records first image data showing images sequentially captured by the image sensor at a predetermined shooting period, and a controller that controls an operation of the image sensor and the recorder. The controller operates the image sensor with a frame period shorter than half period of the shooting period, to generate one or plural frames of second image data in addition to capturing the first image data within the shooting period. The second image data shows an image used for control in the imaging apparatus, and is captured with a setting different from a setting for the first image data. When a shutter speed of the first image data is set to be lower than a predetermined value corresponding to a length of the frame period, the controller synthesizes a plurality of images captured in a plurality of frame periods in the shooting period to generate the first image data. When the shutter speed of the first image data is set to high speed which is not lower than the predetermined value, the controller generates the first image data without synthesizing the plurality of images.

According to the imaging apparatus in the present disclosure, it is possible to facilitate accurate control performed during image shooting.

BRIEF DESCRIPTION OF THE DRAWINGS

FIGS. 7A to 7C are diagrams illustrating a modification of the operation of the AF boost mode of the digital camera.

DETAILED DESCRIPTION

Hereinafter, embodiments of the present disclosure will be described with reference to the drawings as appropriate. However, in the detailed description, unnecessary portions of the description related to the prior art and substantially the same configuration may be omitted. This is to simplify the description. In addition, the following description and the accompanying drawings are disclosed to enable those skilled in the art to fully understand the present disclosure, and are not intended to limit the subject matter of the claims.

First Embodiment

Hereinafter, the configuration and operation of a digital camera being an embodiment of an imaging apparatus according to the present disclosure will be described.

1. Configuration

Figure 1:
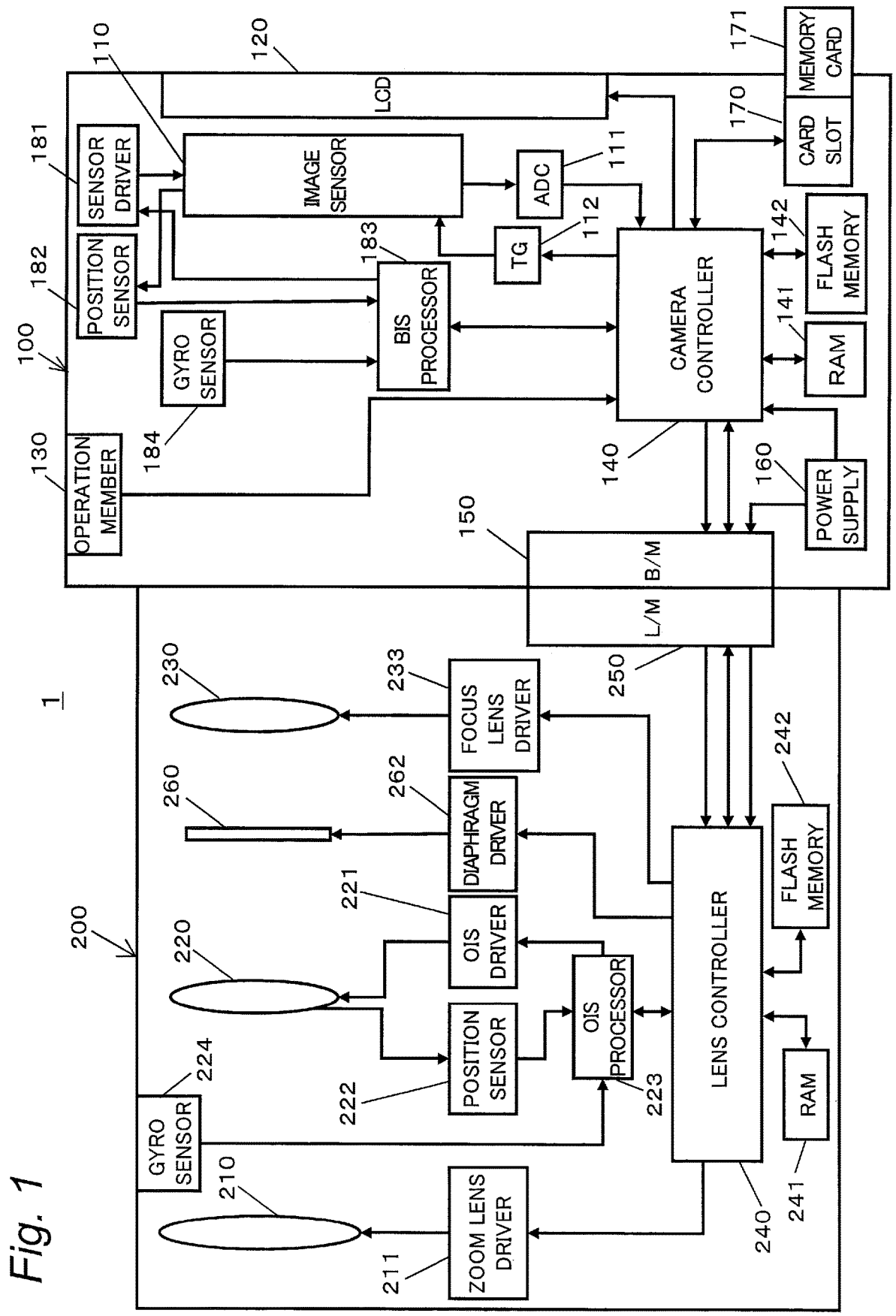
FIG. 1 is a block diagram illustrating a configuration of a digital camera according to a first embodiment of the present disclosure.

FIG. 1 is a block diagram showing the configuration of a digital camera 1 according to the first embodiment. The digital camera 1 of the present embodiment includes a camera body 100 and an interchangeable lens 200 attachable thereto and detachable therefrom.

1-1. Camera Body

The camera body 100 (an example of an imaging apparatus) includes an image sensor 110, a liquid crystal monitor 120, an operation member 130, a camera controller 140, a body mount 150, a power supply 160, and a card slot 170.

The camera controller 140 controls the whole operation of the digital camera 1 by controlling components such as the image sensor 110 according to instructions from the operation member 130. The camera controller 140 transmits a vertical synchronization signal (VD) to the timing generator 112. In parallel with this, the camera controller 140 generates a synchronization signal synchronized with the vertical synchronization signal, and transmits the synchronization signal to the lens controller 240 via the body mount 150 and the lens mount 250. Hereinafter, the synchronization signal transmitted from the camera body 100 to the interchangeable lens 200 is referred to as a "BL synchronization signal". The camera controller 140 uses a RAM 141 as a work memory during control operations and image processing operations.

The image sensor 110 is a device that captures a subject image incident through the interchangeable lens 200 to generate image data. The image sensor 110 is a CMOS image sensor, for example. The generated image data is digitized by an AD converter 111. The digitized image data is subjected to predetermined image processing by the camera controller 140. The predetermined image processing includes, for example, gamma correction processing, white balance correction processing, defect correction processing, YC conversion processing, electronic zoom processing, and JPEG compression processing. The image sensor 110 may be a CCD image sensor, an NMOS image sensor, or the like.

The image sensor 110 operates at the timing controlled by the timing generator 112. The image sensor 110 generates a still image, a moving image, or a through image for recording. The through image is mainly a moving image, and is displayed on the liquid crystal monitor 120 in order for the user to determine composition for capturing a still image.

The liquid crystal monitor 120 displays an image such as a through image and various information such as a menu screen. Instead of the liquid crystal monitor, another type of display device, for example, an organic EL display device may be used.

The operation member 130 includes various operation members such as a release button for instructing start of capturing, a mode dial for setting a capturing mode, and a power switch.

A card slot 170 can mount a memory card 171, and controls the memory card 171 based on control from the camera controller 140. The digital camera 1 can store image data into the memory card 171 and can read image data from the memory card 171.

The power supply 160 is a circuit that supplies power to each element in the digital camera 1.

The body mount 150 is mechanically and electrically connectable with the lens mount 250 of the interchangeable lens 200. The body mount 150 can transmit and receive data to and from the interchangeable lens 200 via the lens mount 250. The body mount 150 transmits the exposure synchronization signal received from the camera controller 140 to the lens controller 240 via the lens mount 250. Also, other control signals received from the camera controller 140 are transmitted to the lens controller 240 via the lens mount 250. The body mount 150 transmits the signal received from the lens controller 240 to the camera controller 140 via the lens mount 250. The body mount 150 supplies the power from the power supply 160 to the whole interchangeable lens 200 via the lens mount 250. The body mount 150 is an example of an acquisition module that acquires various types of information from the interchangeable lens 200 in the camera body 100.

In addition, as a configuration to achieve the BIS function (function to correct a camera shake with the shift of the image sensor 110), the camera body 100 further includes a gyro sensor 184 (camera shake detector) for detecting the camera shake of the camera body 100, and a BIS processor 183 for controlling the image stabilization processing based on the detection result of the gyro sensor 184. Furthermore, the camera body 100 includes a sensor driver 181 that moves the image sensor 110, and a position sensor 182 that detects the position of the image sensor 110.

The sensor driver 181 can be implemented with a magnet and a flat coil, for example. The position sensor 182 is a sensor that detects the position of the image sensor 110 in a plane perpendicular to the optical axis of the optical system. The position sensor 182 can be implemented with a magnet and a Hall element, for example.

The BIS processor 183 controls the sensor driver 181 based on the signal from the gyro sensor 184 and the signal from the position sensor 182, to shift the image sensor 110 in a plane perpendicular to the optical axis so as to offset the camera shake of the camera body 100. The range in which the image sensor 110 can be driven by the sensor driver 181 is mechanically limited. The range in which the image sensor 110 can be mechanically driven is referred to as a "drivable range".

1-2. Interchangeable Lens

The interchangeable lens 200 includes an optical system, a lens controller 240, and a lens mount 250. The optical system includes a zoom lens 210, an optical image stabilizer (OIS) lens 220, a focus lens 230, and a diaphragm 260.

The zoom lens 210 is a lens for changing the magnification of the subject image formed by the optical system. The zoom lens 210 includes at least one lens. The zoom lens 210 is driven by the zoom lens driver 211. The zoom lens driver 211 includes a zoom ring that can be operated by the user. Alternatively, the zoom lens driver 211 may include a zoom lever and an actuator or a motor. The zoom lens driver 211 moves the zoom lens 210 along the optical axis direction of the optical system according to the operation by the user.

The focus lens 230 is a lens for changing the focus state of the subject image formed on the image sensor 110 in the optical system. The focus lens 230 includes at least one lens. The focus lens 230 is driven by a focus lens driver 233.

The focus lens driver 233 includes an actuator or a motor, and moves the focus lens 230 along the optical axis of the optical system based on the control of the lens controller 240. The focus lens driver 233 can be implemented with a DC motor, a stepping motor, a servo motor, an ultrasonic motor, or the like. Each of the lens controller 240 and the focus lens driver 233 is an example of the focusing driver in the digital camera 1.

The OIS lens 220 is a lens for correcting a blur of a subject image formed by the optical system of the interchangeable lens 200 in the OIS function (function to correct a camera shake by shifting the OIS lens 220). The OIS lens 220 reduces the blur of the subject image on the image sensor 110 by moving in a direction of offsetting the camera shake of the digital camera 1. The OIS lens 220 includes at least one lens. The OIS lens 220 is driven by an OIS driver 221.

The OIS driver 221 shifts the OIS lens 220 in a plane perpendicular to the optical axis of the optical system under the control of the OIS processor 223. The range in which the OIS lens 220 can be driven by the OIS driver 221 is mechanically limited. The range in which the OIS lens 220 can be mechanically driven by the OIS driver 221 is referred to as a drivable range. The OIS driver 221 can be implemented with a magnet and a flat coil, for example. A position sensor 222 is a sensor that detects the position of the OIS lens 220 in a plane perpendicular to the optical axis of the optical system. The position sensor 222 can be implemented, for example, with a magnet and a Hall element. The OIS processor 223 controls the OIS driver 221 based on the output of the position sensor 222 and the output of a gyro sensor 224 (camera shake detector).

The diaphragm 260 adjusts the amount of light incident on the image sensor 110. The diaphragm 260 is driven by a diaphragm driver 262, and the size of the opening is controlled. The diaphragm driver 262 includes a motor or an actuator.

The gyro sensor 184 or 224 detects the camera shake (vibration) in the yawing direction and the pitching direction based on an angular change per unit time, that is, an angular velocity, of the digital camera 1. The gyro sensor 184 or 224 outputs an angular velocity signal indicating the amount of the detected camera shake (angular velocity) to the BIS processor 183 or the OIS processor 223. The angular velocity signal output by the gyro sensor 184 or 224 may include a wide range of frequency components due to a camera shake, mechanical noise, or the like. Instead of the gyro sensor, another sensor capable of detecting the camera shake of the digital camera 1 can also be used.

The camera controller 140 and the lens controller 240 may include hard-wired electronic circuits, or may include a microcomputer using a program or the like. For example, the camera controller 140 and the lens controller 240 can be implemented with a processor such as a CPU, an MPU, a GPU, a DSP, an FPGA, or an ASIC.

The digital camera 1 of the present embodiment includes a shutter mechanism (not shown) such as a mechanical shutter. Further, the camera controller 140 of the digital camera 1 may control an imaging operation of the image sensor 110 by an electronic shutter, an electronic front curtain, or the like.

2. Operation

The operation of the digital camera 1 configured as described above will be described below.

2-1. Wobbling Control

The digital camera 1 performs an autofocus operation (AF operation) using the contrast AF method. In the AF operation during moving image shooting, wobbling control is performed to move the focus lens 230 in the in-focus position direction while moving the focus lens 230 back and forth along the optical axis by a minute distance.

Figure 2:
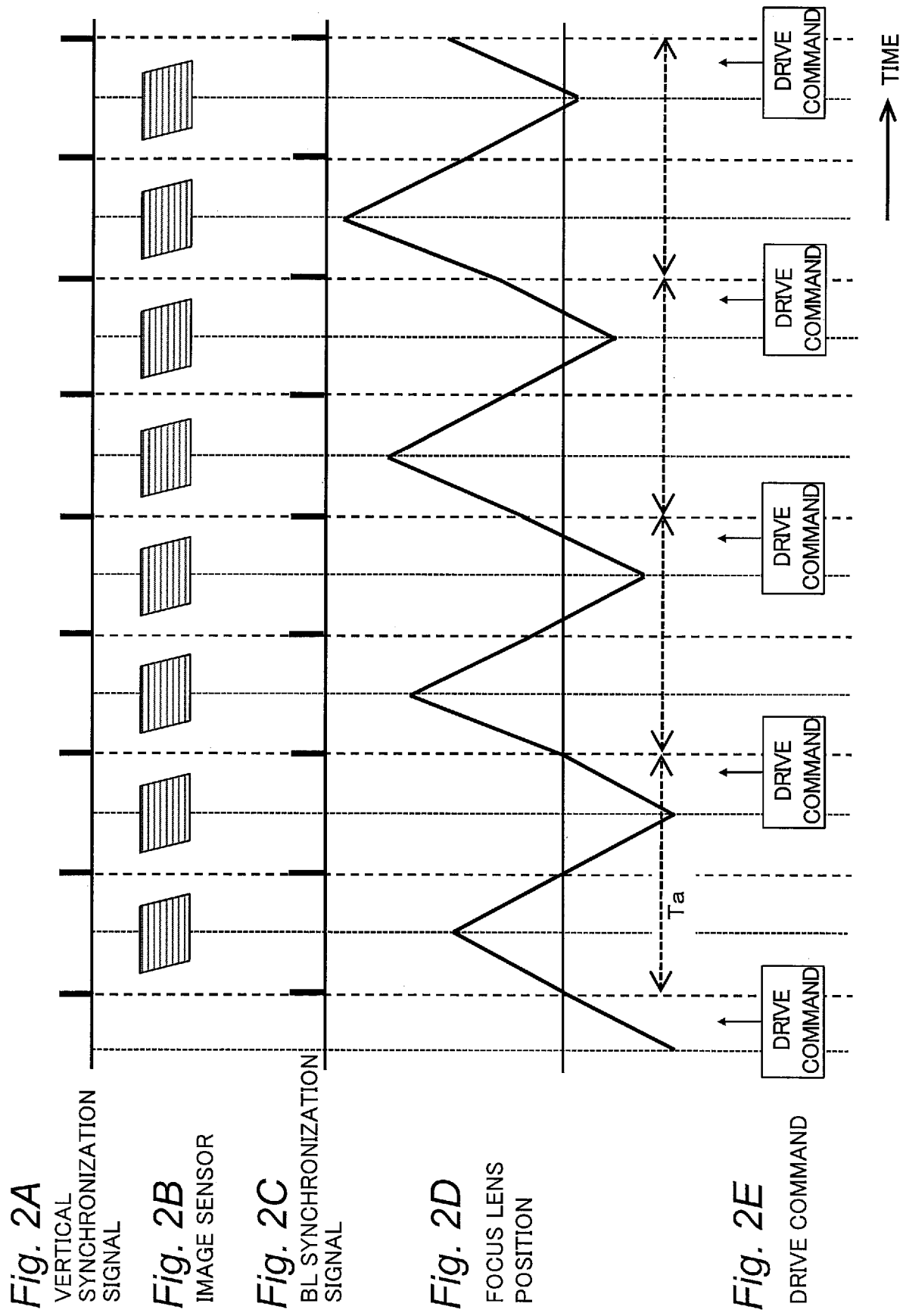
FIGS. 2A to 2E are diagrams illustrating a wobbling operation in the digital camera.

FIGS. 2A to 2E are diagrams illustrating a wobbling operation in the digital camera 1. FIG. 2A shows a vertical synchronization signal generated by the camera controller 140 of the camera body 100. FIG. 2B shows an imaging state by the image sensor 110. FIG. 2C shows a BL synchronization signal transmitted from the camera body 100 to the interchangeable lens 200. FIG. 2D shows the position of the focus lens 230 which changes by the wobbling operation. FIG. 2E shows a drive command for wobbling control transmitted from the camera controller 140 of the camera body 100 to the lens controller 240 of the interchangeable lens 200.

As shown in FIGS. 2A and 2B, the image sensor 110 in the camera body 100 captures a subject image in synchronization with the vertical synchronization signal (VD). At the same time, as shown in FIGS. 2C and 2D, the focus lens 230 in the interchangeable lens 200 is controlled with wobbling in synchronization with the imaging operation in the image sensor 110.

Specifically, the lens controller 240 receives a drive command for wobbling control from the camera controller 140. The lens controller 240 performs wobbling control of the focus lens 230 according to the drive command. At this time, when an image of a predetermined AF area is captured by the image sensor 110, the focus lens 230 is driven so that the displacement of the focus lens 230 is maximized, whereby the contrast value can be detected in the AF area.

The lens controller 240 performs wobbling control in synchronization with the BL synchronization signal received from the camera controller 140 (see FIG. 2E). In the example in FIG. 2E, the drive command is received every two frame periods.

2-2. AF Boost Operation 2-2-1. Outline of Operation

For the AF operation depending on the wobbling control as described above, when the subject moves at high speed during shooting of a moving image, it may be difficult to follow a focus position of the subject, for example. Further, when the exposure at shooting and recording a moving image is not suitable for AF control, it is conceivable that the accuracy of AF control may be lowered due to erroneous detection or the like.

Therefore, the digital camera 1 of the present embodiment has an AF boost mode, which is an operation mode for performing the AF control with high accuracy even in the above case. Hereinafter, the outline of the AF boost operation, which is the operation of the digital camera 1 in the AF boost mode, will be described with reference to FIGS. 3A to 3C.

Figure 3:
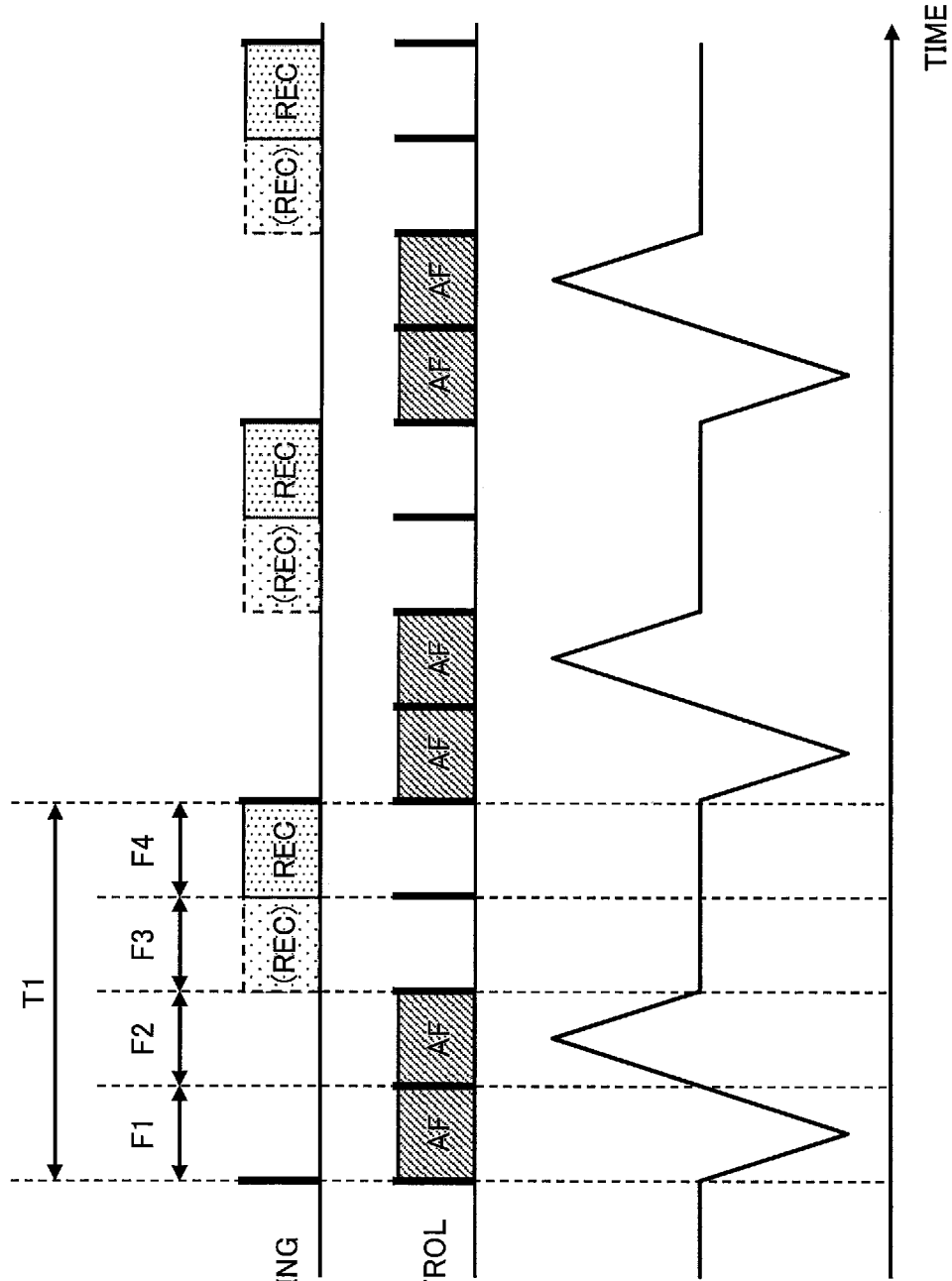
FIGS. 3A to 3C are diagrams illustrating an outline of an operation of an AF boost mode of the digital camera in the first embodiment.

FIGS. 3A to 3C are diagrams illustrating the outline of the AF boost operation of the digital camera 1 in the present embodiment. The digital camera 1 of the present embodiment operates the image sensor 110 (and the focus lens driver 233, or the like) at a frame rate four times the frame rate set for shooting recording of the moving image during the AF boost operation, for example. As a result, the period corresponding to the frame rate for shooting recording, that is, a shooting period T1, includes a period of four frames F1 to F4 as shown in FIGS. 3A to 3C.

FIG. 3A illustrates imaging timing of a recording frame in the AF boost operation of the present embodiment. FIG. 3B illustrates the imaging timing of an AF control frame in this operation. FIG. 3C illustrates operation timing of wobbling control in this operation.

In the digital camera 1, the image data recorded during the AF boost operation is generated one frame at each shooting period T1 as shown in FIG. 3A, for example. As illustrated in FIG. 3B, the digital camera 1 of the present embodiment is provided with a dedicated AF control frame in addition to the recording frame in the shooting period T1. In the example of FIGS. 3A and 3B, the first half frames F1 and F2 are used for AF control and the latter half frames F3 and F4 are used for recording in the shooting period T1.

In the AF boost operation of the present embodiment, the wobbling control of the focus lens 230 is intermittently performed every two frames F1 and F2 for AF control in the shooting period T1 as shown in FIG. 3C. As a result, the wobbling operation can significantly set the amplitude of the focus lens 230 without deteriorating the quality of the image for recording. Thus, it can improve the tracking performance of the AF control.

In the digital camera 1 of the present embodiment, the exposure for capturing the AF control frame is set separately from the exposure for recording. Further, in the AF boost mode of the present embodiment, the two frames F3 and F4 for recording are used to ensure the degree of freedom of the shutter speed in the image data for recording. Hereinafter, the details of the operation of the AF boost mode of the digital camera 1 in the present embodiment will be described.

2-2-2. Details of Operation

FIGS. 4A to 4E are timing charts illustrating an operation of the digital camera 1 according to the present embodiment. FIG. 5 is a flowchart illustrating the operation of the digital camera 1.

Figure 4:
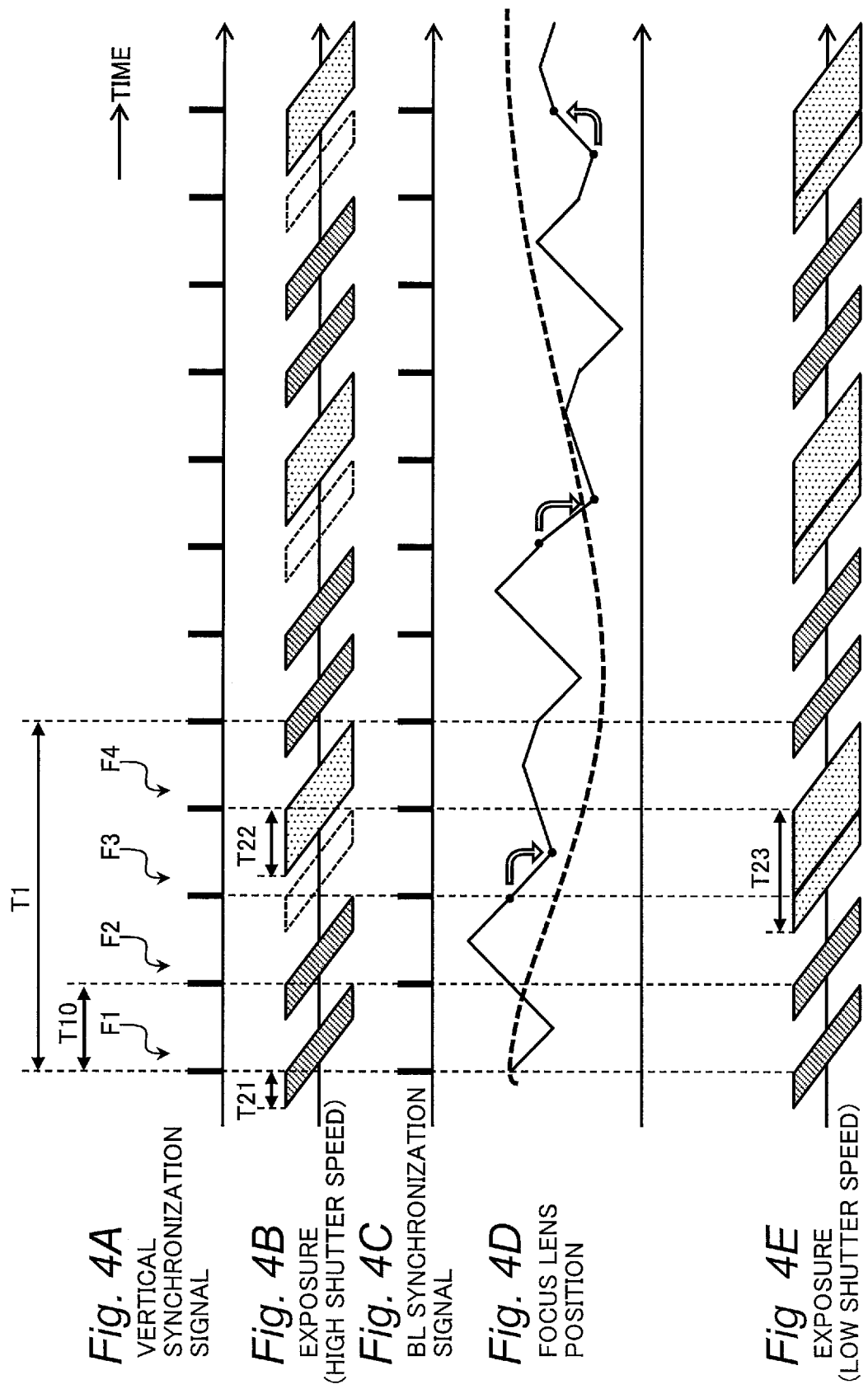
FIGS. 4A to 4E are timing charts illustrating an operation of the digital camera according to the first embodiment.
Figure 5:
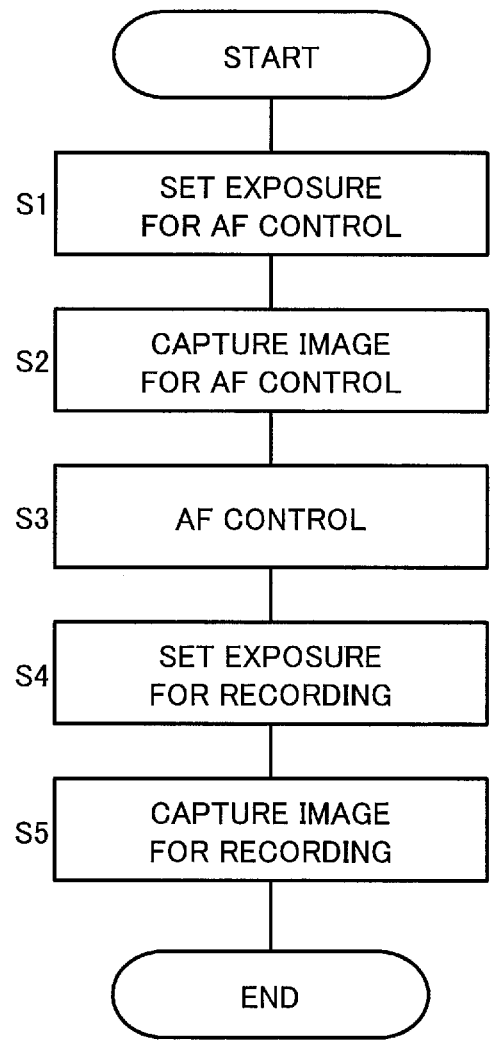
FIG. 5 is a flowchart illustrating the operation of the digital camera according to the first embodiment.

FIG. 4A illustrates the generation timing of the vertical synchronization signal in the AF boost operation of the present embodiment. FIG. 4B illustrates an exposure timing of the image sensor 110 in this operation. FIG. 4C illustrates the generation timing of the BL synchronization signal in this operation. FIG. 4D illustrates the focus lens position in this operation. Further, in FIG. 4D, a ground truth position where the focus lens 230 focuses on the subject is also shown by a dashed line.

In the digital camera 1 of the present embodiment, the AF boost operation is performed in a state where the frame rate for shooting recording and the like are set in advance by a user operation of the setting menu, for example. As shown in FIG. 4A, the camera controller 140 of the digital camera 1 generates a vertical synchronization signal having a frame period T10 which is ¼ of the shooting period T1 based on the set frame rate, and supplies the generated vertical synchronization signal to the image sensor 110, for example.

The image sensor 110 operates to be capable of performing an imaging operation at a frame rate four times the frame rate for shooting recording, based on the vertical synchronization signal supplied from the camera controller 140 (see FIG. 4B). For example, when the frame rate for shooting recording is set to 24 frame per second (fps), 25 fps, or 30 fps by the user operation, the image sensor 110 or the like operates at 96 fps, 100 fps, or 120 fps, respectively.

The camera controller 140 generates a BL synchronization signal as shown in FIG. 4C in the same period as the vertical synchronization signal in FIG. 4A, and supplies the BL synchronization signal to the interchangeable lens 200. In the interchangeable lens 200, the lens controller 240 controls the focus lens driver 233 and the like so as to drive the optical system such as the focus lens 230, according to the above period based on the supplied BL synchronization signal, for example.

In the AF boost operation of the present embodiment, the camera controller 140 executes the processing shown in FIG. 5, for example, every shooting period T1. At first, the camera controller 140 sets the exposure in the digital camera 1 for AF control (S1). The exposure setting for AF control is stored in advance in the flash memory 142 as a set value. For example, the exposure setting for AF control has a faster shutter speed and a higher ISO sensitivity than the exposure setting assumed for recording.

Next, the camera controller 140 controls the image sensor 110 and others so as to capture an image for AF control at the exposure set in the digital camera 1 (S2). For example, as shown in FIG. 4B, the image sensor 110 exposes for an exposure period T21 according to the shutter speed for AF control in each of the first and second frames F1 and F2, and performs imaging operation for the two frames. At this time, according to the high-speed shutter speed for AF control, the exposure period T21 is relatively shorter, and thereby it is possible to suppress exposure blur due to the movement of the subject.

In step S2, as shown in FIG. 4D, the camera controller 140 performs the wobbling control of the focus lens 230 during the period of the first and second frames F1 and F2, via data communication with the lens controller 240, for example (FIG. 4C). At this time, as the image to be captured is for the AF control and not for recording, the amplitude of the focus lens 230 in the wobbling operation can be set significantly, e.g., to the extent that blurring may occur in the image.

Next, the camera controller 140 performs the AF control in the digital camera 1 based on the image data captured in the first and second frames F1 and F2, for example (S3). In the AF control in step S3, the position of the focus lens 230 (to focus on the subject) is determined during the subsequent imaging for recording.

For example, in the AF control in step S3, the camera controller 140 first sequentially acquires the image data as the imaging result of the frames F1 and F2 from the image sensor 110, to calculate an AF evaluation value such as a contrast value for each frame. The camera controller 140 compares the AF evaluation values of the frames with each other, and determines the direction and movement amount of the focus lens 230 from the current position, based on the comparison result. For example, the camera controller 140 notifies the determined moving direction to the lens controller 240 for controlling the focus lens 230 to drive the focus lens 230 (FIG. 4C).

The movement of the focus lens 230 as a result of the AF control described above is performed during the period of the third frame F3, for example (FIG. 4D). In the example of FIG. 4D, the focus lens 230 is driven to advance and retreat with the same period as the period of the wobbling operation and minute amplitude during the period of the third and fourth frames F3 and F4. The AF control result can be reflected by adding a determined movement amount to the minute advance/retreat drive of the focus lens 230. The amplitude of this minute advance/retreat drive is set to be small enough not to affect the image quality of the captured image, for example. The amplitude is smaller than the amplitude in the first and second frames F1 and F2, for example. It should be noted that this minute advance/retreat drive may be omitted as appropriate.

Further, the camera controller 140 changes the exposure set in the digital camera 1 from the exposure setting for the AF control to the exposure setting for recording (S4). For example, the exposure setting for recording is set by the user operation or by AE (automatic exposure) control. In AE control, photometry or the like for calculating the appropriate exposure for recording is performed, based on the image data of the recording frame, for example.

The camera controller 140 controls the image sensor 110 and others to capture an image for recording at an exposure changed from the exposure for the AF control in the digital camera 1 (S5). FIG. 4B exemplifies a case where an exposure period T22 corresponding to the shutter speed for recording is ¼ period or less of the shooting period T1.

In the example of FIG. 4B, the image sensor 110 performs the imaging operation so as to expose the fourth frame F4 for the exposure period T22 according to the shutter speed for recording without performing the imaging operation of the third frame, under the control of step S5. As a result, it is possible to suppress a situation in which the image quality of the image for recording is deteriorated due to the movement of the focus lens 230 for reflecting the AF control result on the third frame F3, for example.

The camera controller 140 generates image data for recording (S5), records the generated image data in the memory card 171 via the card slot 170, and ends the processing of the flow illustrated in FIG. 5. The processing of FIG. 5 is repeatedly executed every shooting period T1.

According to the AF boost operation of the digital camera 1 as described above, the imaging for AF control (S2) and the imaging for recording (S5) are performed at different timings in the shooting period T1. This can eliminate the need to consider the appearance of the image for recording that the user views in the imaging for the AF control, and thereby various settings optimal for the AF control can be applied.

As the exposure setting (S1) for the AF control, various settings that make it easy to ensure the amount of information of the subject image in each frame can be applied. For example, the shutter speed for AF control can be set to a high speed with an emphasis on suppressing exposure blur for each frame, without considering the continuous visibility of the moving images. Also, the ISO sensitivity for AF control can be set as high as possible so that even a dark subject can be imaged while allowing the generation of noise in the image.

According to the above exposure setting for AF control (S1), even if the subject moves quickly or has high contrast, in the image shown by the image data for AF control (S2), it is possible to suppress the erroneous detection due to exposure blur or the like. Therefore, it can improve the accuracy of AF control (S3). The exposure setting for AF control may be changed according to the exposure setting for recording, or by AE control or the like.

2-2-3. Frame Synthesis

In the above description, the case where the shutter speed of the exposure setting for recording corresponds to ¼ period or less of the shooting period T1 is described (see FIG. 4B); however, the AF boost operation of the present embodiment can also use a shutter speed lower than the shutter speed corresponding to ¼ period of the shooting period T1. For example, in moving image shooting, there is a request to perform shooting recording using the shutter speed of substantially half period of the shooting period T1. An operation example of the AF boost mode that can meet the request will be described with reference to FIG. 4E.

FIG. 4E illustrates the exposure timing of the image sensor 110 in the AF boost operation when the exposure period T23 corresponding to the shutter speed for recording is larger than ¼ period and is ½ period or less of the shooting period T1. In this example, based on the setting of the shutter speed for recording (S4), the camera controller 140 causes the image sensor 110 to perform an imaging operation in both the third and fourth frames F3 and F4 (S5).

In the example of FIG. 4E, the image sensor 110 performs the imaging operation for two frames so that the total value of the exposure periods in the third and fourth frames F3 and F4 is the exposure period T23 according to the shutter speed for recording by the control of the camera controller 140 (S4, S5). For example, as illustrated in FIG. 4E, the fourth frame F4 is assigned to the maximum exposure period, and the third frame F3 is assigned to the remaining exposure period.

The camera controller 140 generates image data for recording in this example by synthesizing the image data as the imaging result of the third frame F3 as described above and the image data as the imaging result of the fourth frame F4 (S5). As the image data synthesis processing for recording, various image synthesis processing such as smoothing can be applied.

The image data for recording synthesized as described above has the exposure period T23 that is substantially ¼ period or more of the shooting period T1. As described above, in the AF boost operation of the present embodiment, by using the imaging results of the two frames F3 and F4, it is possible to realize a shutter speed of substantially half period of the shooting period T1 in the image data for recording.

As described above, in the digital camera 1 of the present embodiment, by performing the frame synthesis, it is possible to obtain an image equivalent to an image having longer exposure as compared with the case where the frame synthesis is not performed. It is also effective from the viewpoint of noise performance. Further, according to the allocation of the exposure period in the two frames F3 and F4 illustrated in FIG. 4E, it can avoid the situation where the unexposed time interval occurs between the two frames F3 and F4. As a result, it is possible to suppress deterioration of image quality such that a double image is generated in the image data for recording to be synthesized due to the movement of the subject during the time interval.

3. Digest

As described above, the digital camera 1 (and camera body 100) in the present embodiment is an example of an imaging apparatus, and includes an image sensor 110 as an example of an image sensor, a card slot 170 as an example of a recorder, and a camera controller 140 as an example of a controller. The image sensor 110 captures a subject image formed via the interchangeable lens 200 as an example of the optical system to generate image data. The card slot 170 records image data for recording, which is an example of first image data indicating images sequentially captured by the image sensor 110 in a predetermined shooting period T1 (see FIG. 3A). The camera controller 140 controls the operation of the image sensor 110 and the card slot 170. The camera controller 140 operates the image sensor 110 with frame period T10 shorter than half period of the shooting period T1, to generate one or more frames of image data for AF control as an example of the second image data, in addition to capturing the first image data, within the shooting period T1 (see FIG. 3B). The second image data shows an image used for control in the own device, and is captured with a setting different from that of the first image data.

According to the above digital camera 1, during the shooting period T1, the image sensor 110 is operated at the frame period T10 shorter than the half period of the shooting period T1 to generate second image data for control separately from the first image data for recording. For example, the camera controller 140 performs control of the own device based on the generated second image data, and the setting for capturing the second image data is a setting more suitable for controlling the own device than the first image data. With such second image data, it is possible to facilitate accurate control such as AF control performed during shooting of an image such as a moving image in the digital camera 1.

In the present embodiment, the first and second image data have different exposure settings. The exposure setting of the second image data includes at least one of a faster shutter speed or a higher sensor sensitivity, compared to the exposure setting of the first image data (see FIG. 4B). With such an exposure setting, even if the subject moves at high speed or has high contrast, the second image data is more likely to suppress exposure blurring than the first image data, and it is easier to obtain more information on the subject image. As a result, it is possible to facilitate the control using the second image data in the digital camera 1 with high accuracy.

In the present embodiment, the interchangeable lens 200 includes a focus lens 230 that can move along the optical axis. The camera controller 140 causes the focus lens 230 to move the position of the focus lens 230 back and forth along the optical axis every frame period T10 at which the second image data is captured in the shooting period T1 (see FIG. 3C). The camera controller 140 performs focus control for setting the position of the focus lens 230 at the time of capturing the first image data as the control using the second image data (S3). As a result, the AF control can be easily performed with high accuracy by using the second image data in the digital camera 1.

In the present embodiment, the frame period T10 may be ⅓ period or less of the shooting period T1. The camera controller 140 causes the position of the focus lens 230 to advance and retreat during a plurality of frame periods T10 different from those at the time of capturing the first image data (F3 and F4) in the shooting period T1 so as to acquire the second image data of the plurality of frames F1 and F2 from the image sensor 110 (see FIGS. 3B and 3C). The camera controller 140 performs focus control, based on the acquired second image data of the plurality of frames F1 and F2 (S3). In this way, by providing the AF control frames F1 and F2 separately from the recording frames F3 and F4, it is possible to use an appropriate exposure for AF control regardless of the exposure for recording, for example. In addition, the amplitude of the wobbling operation of the focus lens 230 can be set significantly. This makes the AF control more accurate and easier.

In the present embodiment, when the shutter speed of the first image data is set to be lower than a predetermined value such as the shutter speed corresponding to the frame period T10, the camera controller 140 synthesizes a plurality of images to be captured in the plurality of frame frames T10 in the shooting period T1 so as to generate the first image data (FIG. 4E). As a result, it is possible to realize the low shutter speed in the first image data for recording with obtaining the second image data for control, during the shooting period T1. Therefore, even if various controls are performed using the second image data during the image shooting, the degree of freedom of the shutter speed for recording can be ensured, and such control can be easily allowed for the user.

In the present embodiment, in the plurality of images from which the first image data is synthesized, the exposure period of the image first captured in the shooting period T1 may be equal to or less than the exposure period of the images captured thereafter (FIG. 4E). This makes it easier to avoid a situation in which a double image is generated during the image synthesis, and can improve the image quality of the first image data.

Second Embodiment

In the first embodiment, the digital camera 1 using the image data for AF control has been described. In a second embodiment, a digital camera 1 that uses image data for various controls, not limited to AF control, will be described.

Hereinafter, the digital camera 1 according to the present embodiment will be described by omitting the description of the same configuration and operation as the digital camera 1 according to the first embodiment as appropriate.

Figure 6:
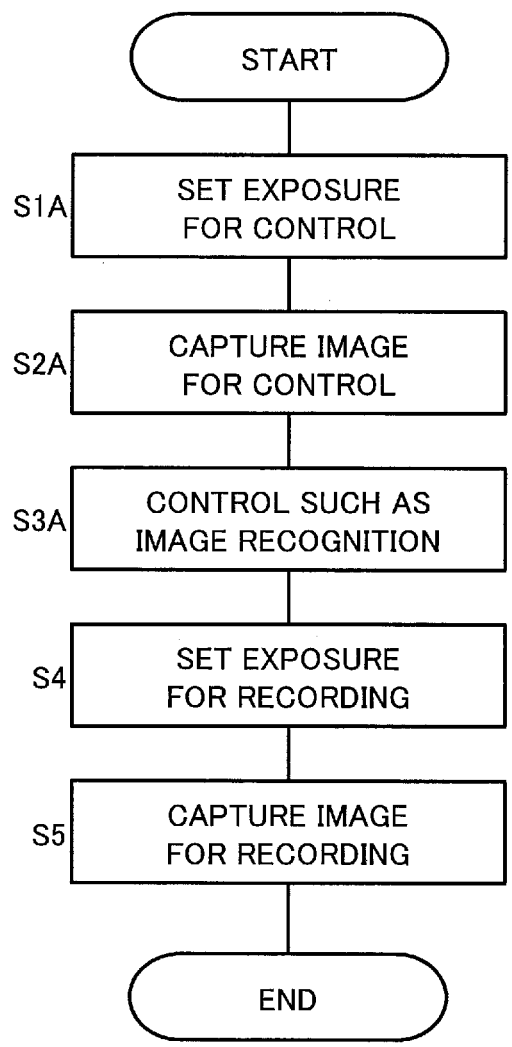
FIG. 6 is a flowchart illustrating an operation of a digital camera according to a second embodiment.

FIG. 6 is a flowchart illustrating an operation of the digital camera 1 according to the second embodiment. In the first embodiment, the AF boost operation (FIG. 5) in which the AF control frame is captured separately from the recording frame has been described. In the present embodiment, similarly to the first embodiment (FIG. 5), the camera controller 140 executes steps S1A to S5 illustrated in FIG. 6 for each shooting period T1, and uses a frame, which is different from the frame for recording, for alternative control to AF control (S1A to S3A).

In the present embodiment, instead of the exposure setting for AF control in the first embodiment (S1 in FIG. 5), the camera controller 140 sets various control settings in the digital camera 1 (S1A). The setting of step S1A may include the same exposure setting as the setting for AF control, and may include, e.g. the high shutter speed.

According to the setting in step S1A, the camera controller 140 performs an imaging operation of the control frame separately from the imaging for recording (S5) as in the first embodiment (S2A). For example, the number of frames captured in step S2A is two frames as in the first embodiment. Step S2A is not limited to this, and various frames may be captured according to the control (S3A) to be applied.

In the operation example of FIG. 6, based on the captured image data for control (S2A), the camera controller 140 performs image recognition for detecting various information on the subject as the alternative control to the AF control (S3A). For example, the image recognition processing (S3A) based on machine learning detects an area in which a specific type of subject such as a human body is reflected in an image indicated by image data. For example, by imaging (S1A, S2A) set to the high shutter speed, erroneous detection due to exposure blur can be suppressed. Thus, the accuracy of image recognition can be improved.

In step S3A, the camera controller 140 performs various operations in the digital camera 1, based on various information detected by the image recognition processing, for example. For example, the camera controller 140 can determine an AF area in the AF control or a photometric area in the AE control, based on the area where the subject is detected in the image indicated by the image data. The camera controller 140 may display information, which indicates the area where the subject is recognized, on the liquid crystal monitor 120 or the like as an AF frame or the like on a live view image.

The image recognition processing in step S3A is not particularly limited to the above, and various processing can be applied. For example, the type of the subject to be detected in step S3A is not limited to the human body, and may be a part such as a head, a face, or a pupil, or may be a specific person. Further, a detection target may be various information such as an animal other than a person, a moving object such as a vehicle, and information on a scene being shoot. The processing of step S3A is not particularly limited to machine learning, and may be rule-based as appropriate.

In the digital camera 1 of the present embodiment, the control of steps S1A to S3A is not limited to the above, and various controls can be applied. For example, in the imaging for control (S2A), two frames of images with different aperture values may be captured. Based on the control image data captured in this way, the camera controller 140 may perform DFD (Depth From Defocus) calculation processing using the difference in the amount of blur between the two frames, to perform distance measurement control for calculating the distance to various subjects (S3A). For example, the aperture value for control is set by increasing or decreasing from the aperture value at the time of capturing for recording for each frame (S1A). According to this setting, the diaphragm driver 262 drives the diaphragm 260 (S2A).

Further, in the imaging for control (S2A), the BIS function or the OIS function may be driven to capture an image in an angle of view range deviated from the recording image. Based on the captured image data, the camera controller 140 may perform predictive control to detect an object that enters the view range of the image for recording or an object that exits the view range (S3A). In this case, the shift amount for driving the image sensor 110 with the sensor driver 181 in the BIS function or the shift amount for driving the OIS lens 220 with the OIS driver 221 in the OIS function is set (S1A).

Further, in the imaging for control (S2A), an image in which the zoom lens 210 is driven to change the angle of view may be captured. For example, the camera controller 140 may acquire, as the image for control, image data having a wider angle of view than the angle of view of the image data for recording, and perform predictive control similar to the above description (S3A). In this case, the position of the zoom lens 210 driven by the zoom lens driver 211 is set according to the angle of view.

As described above, in the digital camera 1 of the present embodiment, the camera controller 140 performs image recognition of a subject as a control using the second image data, for example (S3A). By using the image data for control different from the image data for recording, such image recognition control can be performed with high accuracy.

In the present embodiment, the setting (S1A) of the image data for control (second image data) is to change a state of at least one of the focus lens 230, the diaphragm 260, the zoom lens 210, and the OIS lens 220 (camera shake correction lens) included in the optical system such as the interchangeable lens 200, or the sensor driver 181 (camera shake correction mechanism) that drives the position of the image sensor 110, from a state at the time of capturing the image data for recording (first image data). In the imaging (S2A) different from the imaging for recording (S5), settings suitable for various controls to which the image data for control is applied can be adopted, and it is easy to improve the accuracy of the control.

Other Embodiments

As described above, the first and second embodiments are described as an example of the technique disclosed in the present application. However, the technique in the present disclosure is not limited thereto, and can also be applied to embodiments in which changes, substitutions, additions, omissions, and the like are made as appropriate. In addition, it is also possible to combine each component described in each embodiment to form a new embodiment. Thus, in the following, other embodiments will be exemplified.

In the first embodiment described above, the operation example in which the wobbling control is intermittently performed in the AF boost mode has been described, but the wobbling control does not have to be intermittent. A modification of the operation of the AF boost mode in the digital camera 1 will be described with reference to FIGS. 7A to 7C.

FIGS. 7A to 7C are diagrams illustrating a modification of the AF boost operation of the digital camera 1. FIG. 7A illustrates imaging timing of a recording frame in an AF boost operation of the present modification. FIG. 7B illustrates the imaging timing of an AF control frame in this operation. FIG. 7C illustrates operation timing of wobbling control in this operation.

In the present modification, as shown in FIG. 7C, continuous wobbling control is performed wherein the focus lens 230 is driven so as to repeatedly move and stop every frame period T10. Specifically, in the shooting period T1, the focus lens 230 moves during the period of the first frame F1, and stops during the period of the second frame F2. Subsequently, the focus lens 230 moves in the direction, which is opposite to the direction for the first frame F1, during the period of the third frame F3, and stops during the period of the fourth frame F4. In the next shooting period T1, the moving direction of the focus lens 230 is opposite to the previous shooting period T1. Therefore, in this example, the wobbling operation period of the focus lens 230 is twice the shooting period T1.

As shown in FIG. 7A, the recording frames are set to the third and fourth frames F3 and F4 in the latter half of the shooting period T1 as in the first embodiment, for example. The position of the focus lens 230 in the fourth frame F4 is controlled to a position for focusing on the subject as a result of AF control. The third frame F3 is used for performing frame synthesis when the shutter speed is low, as in the first embodiment, for example.

On the other hand, in the present modification, the AF control frames are set to the second frame F2 and the fourth frame F4 in the shooting period T1 as shown in FIG. 7B, for example. That is, in the present modification, the second frame F2 is a frame dedicated to AF control, while the fourth frame F4 is used for both of AF control and recording. The camera controller 140 performs AF control so that the position of the focus lens 230 of the next fourth frame F4, based on the AF evaluation value of the second frame F2 and the AF evaluation value of the previous fourth frame F4, for example.

In the AF control of the present modification, the amplitude of the wobbling control can be largely ensured, Thus, the tracking accuracy of the AF control can be improved by significantly moving the position of the focus lens 230 during the period of the second frame F2. The exposure setting of the present modification is common between the second and fourth frames F2 and F4, for example.

When the shutter speed for shooting recording is the low speed, which is over the frame period T10, the camera controller 140 performs image synthesis processing of the third frame F3 and the fourth frame F4 to generate image data for recording, as in the first embodiment. The image data of the fourth frame F4 is an example of the third image data in the present embodiment. Further, the image data of the third frame F3 captured at the time of frame synthesis is an example of fourth image data in the present embodiment.

As described above, in the digital camera 1 of the present embodiment, the frame period T10 is ¼ period or less of the shooting period T1. The focus lens 230 alternates between moving and stopping every frame period T10 (see FIG. 7C). The camera controller 140 acquires the second image data and the third image data as the imaging result of the two frame periods T10 in which the focus lens 230 stops at different positions in the shooting period T1, and performs focus control based on the acquired second and third image data (see FIGS. 7B and 7C). The third image data constitutes the first image data or the image data of the synthesis source of the first image data. That is, the first image data is constituted by synthesizing the third image data and the fourth image data captured in the frame period T10 different from that of the second and third image data in the imaging period T1, or is constituted by the third image data without synthesizing. Similarly to the first embodiment, the AF boost operation of the digital camera 1 also makes it possible to ensure a large amplitude of the wobbling operation and facilitate the AF control in imaging for desired recording.

For example, when the shutter speed of the first image data is set to be lower than a predetermined value in the present embodiment, the camera controller 140 synthesizes the image captured in the frame period T10 different from that at the time of capturing the second and third image data and the image indicated by the third image data to generate the first image data, in the shooting period T1. As a result, a low shutter speed can be realized even by the AF boost operation of the present embodiment.

In the above embodiments, the example of synthesizing the plurality of frames of images when the shutter speed of the image data for recording is low has been described. The low shutter speed is not limited to be realized by the image synthesis processing, and may be realized by the processing to extend a vertical synchronization signal, for example. For example, the camera controller 140 generates a vertical synchronization signal for each shooting period T1 so as to include a pulse having a period extended from the frame period T10, in addition to a pulse having a frame period T10 for performing the imaging for control. The camera controller 140 uses the frame having such an extended period for recording, to cause the image sensor 110 to perform an imaging operation with an exposure period according to the shutter speed for recording.

For example, by including a period twice the frame period T10 instead of the third and fourth frames F3 and F4 of the first embodiment, a low shutter speed up to a half period of the shooting period T1 can be realized as in the first embodiment. As described above, when the shutter speed of the first image data is set to be lower than a predetermined value, the camera controller 140 may cause the image sensor 110 to capture an image of the first image data in the extended period including the period extended from the frame period T10 at a timing different from the frame period T10 at the time of capturing the second image data, in the shooting period T1. The extension of the vertical synchronization signal is not limited to twice the frame period T10, and may be extended to a desired width according to the shutter speed and the like.

In the above embodiments, the card slot 170 is exemplified as the recorder of the digital camera 1, but the recorder is not limited thereto. In the present embodiment, the recording medium as the recording destination by the recorder is not limited to the memory card 171, and may be an external storage device such as an SSD drive. In the present embodiment, the recorder may be various interface circuits for writing data from the digital camera 1 to the external storage device, or may be various communication modules for transmitting data according to various communication standards.

In the above embodiments, an interchangeable lens type digital camera is described as an example of the imaging apparatus, but the imaging apparatus of the present embodiment may be not in particular an interchangeable lens type digital camera. The idea of the present disclosure may be applied not only to a digital camera but also to a movie camera, and can also be applied to an electronic device having various imaging functions such as a mobile phone or a PC with a camera.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be certified that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

The idea of the present disclosure can be applied to an electronic device having an imaging function (an imaging apparatus such as a digital camera, a camcorder, and a box camera, a mobile-phone, a smartphone, and the like).

The invention claimed is:

1. An imaging apparatus comprising:
   an image sensor that captures a subject image formed via an optical system to generate image data;
   a recorder that records first image data showing images sequentially captured by the image sensor at a predetermined shooting period; and
   a controller that controls an operation of the image sensor and the recorder,
   wherein the controller operates the image sensor with a frame period shorter than half period of the shooting period, to generate one or plural frames of second image data by capturing in another frame period than the frame period for capturing the first image data within the shooting period,
   the second image data shows an image which is not recorded by the recorder but rather is used for control in the imaging apparatus, and is captured with a setting different from a setting for the first image data, and
   the control is performed based on a plurality of frames of image data including the one or plural frames of second image data, the plurality of frames being obtained by multiple times of capturing in the shooting period.

2. The imaging apparatus according to claim 1, wherein the first image data has an exposure setting different from an exposure setting for the second image data, and
   the exposure setting for the second image data includes at least one of a faster shutter speed or a higher sensor sensitivity, compared to the exposure setting for the first image data.

3. The imaging apparatus according to claim 1, wherein the optical system includes a focus lens that is movable along an optical axis,
   the controller causes the focus lens to move a position of the focus lens back and forth along the optical axis for each frame period at which the second image data is captured in the shooting period, and
   the controller performs, as the control using the second image data, a focus control to set a position of the focus lens at capturing the first image data, based on the image data of the plurality of frames in the shooting period.

4. The imaging apparatus according to claim 3, wherein the frame period is ⅓ period or less of the shooting period, and
   the controller
   moves the position of the focus lens back and forth during a plurality of frame periods each different from the frame period for capturing the first image data in the shooting period, to acquire the plural frames of second image data from the image sensor, and performs the focus control, based on the acquired plural frames of second image data.

5. The imaging apparatus according to claim 3, wherein the frame period is ¼ period or less of the shooting period,
the focus lens repeats moving and stopping alternately for each frame period,
the controller
acquires the second image data and third image data as an imaging result of two frame periods in which the focus lens stops at different positions from each other in the shooting period, and
performs the focus control, based on the acquired second and third image data,
wherein the first image data is obtained by synthesis of the third image data and fourth image data, or is obtained by the third image data without the synthesis, the fourth image data being captured in a different frame period from the frame period for capturing the second and from the frame period for capturing third image data in the shooting period.

6. The imaging apparatus according to claim 1, wherein when a shutter speed of the first image data is set to be lower than a predetermined value corresponding to a length of the frame period, the controller synthesizes a plurality of images captured in a plurality of frame periods in the shooting period to generate the first image data, and
when the shutter speed of the first image data is set to high speed which is not lower than the predetermined value, the controller generates the first image data without synthesizing the plurality of images.

7. The imaging apparatus according to claim 1, wherein the controller performs image recognition of a subject as the control using the second image data.

8. The imaging apparatus according to claim 1, wherein the setting for the second image data is to change a state of at least one of a focus lens, a diaphragm, a zoom lens, a camera shake correction lens, or a camera shake correction mechanism from a state at capturing the first image data, wherein the focus lens, the diaphragm, the zoom lens, and the camera shake correction lens are included in the optical system, and the camera shake correction mechanism drives a position of the image sensor.

9. An imaging apparatus comprising:
an image sensor that captures a subject image formed via an optical system to generate image data;
a recorder that records first image data showing images sequentially captured by the image sensor at a predetermined shooting period; and
a controller that controls an operation of the image sensor and the recorder,
wherein the controller operates the image sensor with a frame period shorter than half period of the shooting period, to generate one or plural frames of second image data in addition to capturing the first image data within the shooting period,
the second image data shows an image which is not recorded by the recorder but rather is used for control in the imaging apparatus, and is captured with a setting different from a setting for the first image data,
the optical system includes a focus lens that is movable along an optical axis,
the frame period is ⅓ period or less of the shooting period, and the controller causes the focus lens to move a position of the focus lens back and forth along the optical axis for each frame period at which the second image data is captured in the shooting period, and
the controller performs, as the control using the second image data, a focus control to set a position of the focus lens at capturing the first image data.

10. The imaging apparatus according to claim 9, wherein the controller
moves the position of the focus lens back and forth during a plurality of frame periods each different from the frame period for capturing the first image data in the shooting period, to acquire the plural frames of second image data from the image sensor, and
performs the focus control, based on the acquired plural frames of second image data.

11. The imaging apparatus according to claim 9, wherein the frame period is ¼ period or less of the shooting period,
the focus lens repeats moving and stopping alternately for each frame period,
the controller
acquires the second image data and third image data as an imaging result of two frame periods in which the focus lens stops at different positions from each other in the shooting period, and
performs the focus control, based on the acquired second and third image data,
wherein the first image data is obtained by synthesis of the third image data and fourth image data, or is obtained by the third image data without the synthesis, the fourth image data being captured in a different frame period from the frame period for capturing the second and from the frame period for capturing third image data in the shooting period.

12. An imaging apparatus comprising:
an image sensor that captures a subject image formed via an optical system to generate image data;
a recorder that records first image data showing images sequentially captured by the image sensor at a predetermined shooting period; and
a controller that controls an operation of the image sensor and the recorder,
wherein the controller operates the image sensor with a frame period shorter than half period of the shooting period, to generate one or plural frames of second image data in addition to capturing the first image data within the shooting period,
the second image data shows an image which is not recorded by the recorder but rather is used for control in the imaging apparatus, and is captured with a setting different from a setting for the first image data, wherein
when a shutter speed of the first image data is set to be lower than a predetermined value corresponding to a length of the frame period, the controller synthesizes a plurality of images captured in a plurality of frame periods in the shooting period to generate the first image data, and
when the shutter speed of the first image data is set to high speed which is not lower than the predetermined value, the controller generates the first image data without synthesizing the plurality of images.

* * * * *